US007228613B2

(12) United States Patent
Klobcic

(10) Patent No.: US 7,228,613 B2
(45) Date of Patent: Jun. 12, 2007

(54) WIRE HARNESS MANUFACTURING APPARATUS AND METHOD

(76) Inventor: Nikolaja Klobcic, Zgornje Gorje 9, 4247 Zgornje Gorje (SI)

( * ) Notice: Subject to any disclaimer, the term of this patent is extended or adjusted under 35 U.S.C. 154(b) by 0 days.

(21) Appl. No.: 10/533,306

(22) PCT Filed: Oct. 29, 2003

(86) PCT No.: PCT/SI03/00039

§ 371 (c)(1),
(2), (4) Date: Dec. 15, 2005

(87) PCT Pub. No.: WO2004/040716

PCT Pub. Date: May 13, 2004

(65) Prior Publication Data

US 2006/0101635 A1 May 18, 2006

(30) Foreign Application Priority Data

Oct. 30, 2002 (SI) ................................ 200200265

(51) Int. Cl.
*B23P 23/00* (2006.01)

(52) U.S. Cl. ................... 29/564.4; 29/564.1; 29/33 M; 700/97; 700/117

(58) Field of Classification Search ............... 29/564.1, 29/564.4, 564.6, 564.8, 566.2, 33 M, 854, 29/857, 863; 700/97, 117
See application file for complete search history.

(56) References Cited

U.S. PATENT DOCUMENTS 4,348,805 A 9/1982 Gibbons
5,063,974 A 11/1991 Buckwitz et al.
5,153,839 A * 10/1992 Cross ........................ 29/564.1
5,224,251 A * 7/1993 Cameron et al. .......... 29/33 M
5,781,990 A * 7/1998 Seidler et al. ............ 29/564.4
5,878,489 A * 3/1999 Shioda et al. ................. 29/857
6,169,934 B1 * 1/2001 Nakayama et al. ........ 29/564.1
6,272,387 B1 * 8/2001 Yoon ........................... 700/17
2003/0181997 A1 * 9/2003 Weber ......................... 700/97

FOREIGN PATENT DOCUMENTS

EP 0 508 695 A2 10/1992
EP 0 778 587 A2 6/1997
WO WO-00/62381 A1 10/2000

* cited by examiner

*Primary Examiner*—Dana Ross
(74) *Attorney, Agent, or Firm*—Connolly Bove Lodge & Hutz, LLP; Larry J. Hume

(57) ABSTRACT

A device and a method for manufacturing of bundles of wires fixed in terminal boards for building wiring allows manufacturing of bundles of wires for individual sections from one to another junction point, so that the length and sheathing of each bundle correspond to the in situ status, whereby individual wires would be labelled in a way to allow a fitter to connect wires, the ends of which will be previously stripped off and prepared for being connected to other electric elements on junction points only on the basis of labels on wires and other electric elements, without fitter's knowledge of a wiring diagram, whereby after the completion of the input of data the device of the invention automatically performs a list of circuitry elements, a wiring diagram and a circuitry plan for instance in a ground plan of an object, whereby the device of the invention also allows new methods of wiring manufacturing.

9 Claims, 1 Drawing Sheet

WIRE HARNESS MANUFACTURING APPARATUS AND METHOD

Figure 1:
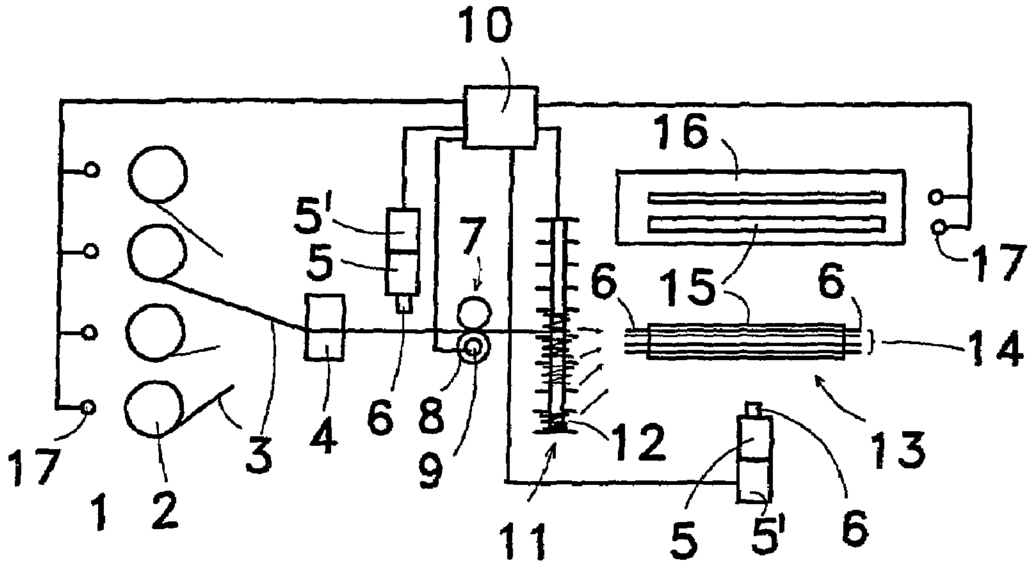

This application is a National Stage of PCT/SI2003/000039 filed Oct. 29, 2003 which in turn claims priority from P-200200265 filed in Slovenia on Oct. 30, 2002.

SUBJECT OF INVENTION

The subject of the invention is a device and a method for manufacturing bundles of wires fixed in terminal boards for building wiring of both residential and business buildings as well as a method of its manufacturing and installation.

TECHNICAL PROBLEM

A technical problem solved by the invention is how to conceive a device to allow manufacturing of bundles of wires for individual sections from one to another junction point so that the length and sheathing of each bundle correspond to the in situ status, whereby individual wires would be labelled in a way to allow a fitter to connect wires, the ends of which will be previously stripped off and prepared for being connected to other electric elements on junction points only on the basis of labels on wires and other electric elements, without fitter's knowledge of a wiring diagram; after the completion of the input of data the device of the invention will at the same time automatically perform a list of circuitry elements, a wiring diagram and a circuitry plan for instance in a ground plan of an object, whereby the device of the invention will also allow new methods of wiring manufacturing.

PRIOR ART

A device of this type has not been known. Electricity wires are laid in compliance with a wiring diagram, which foresees electrical elements and wires to be cut at desired lengths during installation and laying of the wires into adequate concealed cabling or open cabling. Then insulation sheathing is stripped off from wire ends. It is especially time consuming to connect wires with other electric elements on the basis of a wiring diagram of the entire installation. Since the wires are coloured in compliance with standards, it often happens that there are several wires of the same colour within a bundle, which makes it impossible to distinctly recognize both ends of the same wire only by its sheathing colour, we have to use electric current and a phase tester, which is very time consuming. In case of an error or later change or amendment of the circuit, these labels make work even more time consuming and increase a possibility of mistakes.

A consequence of the described mode of installation manufacturing is a relatively long production time, which is very difficult to be foreseen in the plan of work due to expected and unpredictable errors in circuit and in the correction thereof. Often, this type of work causes lags in further building steps, e.g. in making of plastering and floors.

Due to the ever quicker subsequent constructional and installation steps of work, there is a great need for such new device allowing a quicker manufacturing of building wiring under an essentially lower possibility of mistakes in the circuit, whereby installation will cost less and it will be possible to more precisely predict the entire time span of works on a building for wiring due to harmonization with other types of work.

SOLUTION TO THE TECHNICAL PROBLEM

The described technical problem is solved by the device of the invention, the essence of which lies in that a planned wiring diagram of an electric installation is used to define the actual measurements to be done on the building, between the neighbouring junction points, e.g. connection boxes, wall sockets, switches, lamps, fuses etc., said measurements are then entered into a computer program of the invention, also types of individual wires from the plan are entered into the same program, e.g. phase, earth and the like and a cross-section of each wire which is dimensioned in the circuit plan. Further we unambiguously label each electric element, for instance connection box, fuse, switch, lamp, wall socket and the like, whereby this label simultaneously also marks the location of an individual element, for instance the label of the room, in which said elements are foreseen. The program of the invention then selects all wires running between the neighbouring junction points, for instance between two connection boxes or between a connection box and a switch and selects an adequate terminal board, e.g. a concealed tube or a visible canal in compliance with the project. Then follows a printout of electric elements for the entire installation with adequate data defining each element both from the technical point of view (e.g. type of wire, its cross-section, insulation, insulation colour . . . ) and purchasing labels (e.g. factory label of an individual manufacturer, price). At the same time, the computer of the invention is connected to a device of the invention for the manufacture of bundles of wires and controls it. The program controls the device by first indicating the reel, from which a wire should be taken and led into the device, said wire being defined by a cross-section and sheathing colour, then an unambiguous wire label is designed via a printer, which labels it directly on both ends, preferably with a sticker or a label and finally controls the measuring part of the device to cut off the wire to a desired length. The program selects the sequence of manufacturing of individual wires by bundles and defines the terminal board for them, e.g. a concealed tube or canal of an adequate dimension, whereby said terminal board is given an unambiguous label, printed on it directly via the printer, or a label or a sticker is printed. Unambiguous labels of both ends of wires and terminal boards are also entered in plans and lists of electric installation elements. Preferably, the joining parts of all elements to join in the same point are labelled with the same label. E.g. ends of all conductors of one phase present in a connection box and intended for a joint connection bear the same label. When connecting, the fitter only connects the elements bearing the same label. He does not need to read the wiring diagram or plan. It is also impossible to mistake the wires of the same sheathing colours, because the program adjusts the labels for wire ends in an unambiguous way.

Moreover, the program makes a list of elements, e.g. switches, wall sockets and the like and dictates the selection thereof and the composition of a collection of these elements for an individual area within a building, preferably for each room separately, whereby such collection of elements is gathered in one packaging, preferably a bag labelled with an unambiguous label also generated by said program via a printer directly on the bag, or with a label or a sticker, which usually indicates the room or a part of a large space.

These unambiguous labels are preferably arranged in the sense of talkative symbols. Connection boxes for instance bear the labels Dxy, where D means a connection box, x is the sign of the room and y is the number of the connection box in this room. A switch is labelled as Sxy, where S means a switch, x the number of the room and y the number of the switch in this room.

The device of the invention for manufacturing bundles of wires of electric installation consists of reels of wires foreseen to be contained in electric installation of the building, e.g. wires of various cross-sections and various insulation colours as defined by standards. Then there is a set for stripping off insulation sheathing at the beginning of a wire and a printer for labelling the same end of the wire with an unambiguous label, preferably by a label or a sticker. The following part of the device is a wire length meter. This part preferably consists of a pair of driven reels, between which a wire runs. One of the reels has a built-in unit for pace counting of its revolutions, the control computer thus uses this datum to measure the length of the wire run through the reels and stops the unit at the desired wire length and cuts off the wire by means of a special cutter and then uses the unit for stripping off insulation sheathing and strips off sheathing on the last end to be connected to another electric element, whereby this end is also equipped with an unambiguous label via a printer in the form of a label or a sticker.

After the device contains all the wires of one bundle, it selects from its stock of tubes, canals and other terminal boards an adequate type, labels it with an unambiguous label via a printer with a label or a sticker, and introduces the entire wire bundle into it. Follows manufacturing of wire sections for the following bundle by the same mode for the same room of a building. When all wire bundles fixed in terminal boards for the same room are manufactured, the device joins all bundles of wires fixed in terminal boards for one location, preferably a room, into one unit and labels it with an adequate label, e.g. in the shape of a sticker or a tag.

Installation is performed as follows: first, the bundles joined and intended for one location, for instance a room, are arranged to these locations together with the belonging electric elements, e.g. wall sockets, switches and the like, needed for this location and stored in a joint packaging, e.g. a transparent bag labelled with an adequate label. When the walls, ceilings and floors are prepared for electric installation by having grooves for terminal boards with wire bundles and holes for electric elements, e.g. connection boxes, these elements are fastened to adequate places. It is essential that the fitter only follows the labels on individual elements by reading the same labels on the plan for installation. He does not need to understand a wiring plan in the sense of electricity. The fitter can therefore have a lower educational level without any earlier knowledge in the field electricity.

Connection boxes and terminal boards, e.g. tubes are fastened to grooves and holes in the wall, ceiling or floor preferably by plaster. In order to expedite work and to contribute to a higher level of precision, there are special positioning fixing elements needed during the time of setting of plaster, which are however not in direct scope of this invention.

In order that the present invention be more readily understood, an embodiment thereof will now be described with reference to the accompanying drawing in which:

FIG. 1 shows a schematic view of the device of the invention.

The device for manufacturing bundles of wires for building wiring is made of a set 1 of reels 2 of wires 3 of various cross-sections and insulation colours, whereby the colours are preferably in compliance with the standards of labelling wire types: phases, earth ducts, switch ducts etc. The next element of the device is a unit 4 for cutting off wires and stripping off insulation at the end of each treated wire 3. Near the unit 4 there is intended to be a unit 5 for the distribution of unambiguous labels 6 in an optional embodiment, preferably as a self-sticking label, whereby a printer 5' is intended near this unit in order to provide simultaneous printing of these labels 6. After this unit comes a unit 7 for measuring the length of each treated wire 3. This unit is preferably conceived as a set of two parallel and touching cylinders 8, of which one cylinder 8 is equipped with a pace feeder 9 of pulses, which are a basis for the computer program 10 for determination of a desired wire 3 length, which is cut off to an adequate length on the unit 4 and then rewound to a rewinding unit 11 with several sections 12 for separate winding of individual wires 3. After the wire 3 is cut off, the unit 4 strips off the insulation sheathing on the end part of the treated wire 3 and after that at the beginning of a new treated wire 3.

The winding unit 11 is followed by a section 13 for the formation of a bundle 14 of wires 3 running between the two junction points, e.g. between connection boxes. The section 13 is preferably intended as a second field, on which the bundle 14 of wires is led into a terminal board 15 of wires, e.g. a flexible concealed tube, canal, cable tray, etc., which is also labelled with an unambiguous label. If a need occurs, the bundle 14 can also be without the terminal board 15 and wrapped at least on several spots, labelled with an unambiguous label and intended to be installed into an optional terminal board 15, positioned directly on the object, e.g. cable tray.

A container 16 of standard terminal boards 15 is foreseen near the section 13, especially for concealed installation tubes of various diameters.

All the mentioned sets are controlled by the computer program 10. In the described embodiment of the device it is foreseen that each wire be selected manually, put into individual cutting-off units, stripped off insulation, put into a winding reel, put of several wires into a bundle, which is also manually inserted into the terminal board. Labelling with unambiguous labels of wires, bundles, terminal boards and the like is also manual, whereas printing control of the labels or stickers is governed by the computer program 10, which controls all steps for the manufacturing of each individual wire or bundle based on the list of elements and wire bundles and also selects other electric installation elements, like connection boxes, switches, fuses for each individual junction point, which are—in the described embodiment—manually selected into joint packaging and labelled with an unambiguous label as earlier described with wires and bundles.

In order to facilitate work, illuminating bodies 17 are foreseen near reels 2 and types of terminal boards 15, which are used by the computer program 10 to label each adequate wire 3 or terminal boards 15, so the fitter does not need to be acquainted with the wiring diagram.

Due to a large quantity of wiring, the described device is equipped with auxiliary assemblies, replacing manual work with machine-run e.g. robotic assemblies, which would be controlled by the described computer or an amended program.

The method of manufacturing electric bundles of wires for building wiring consists of several steps. The first step comprises a precise measurement of lengths between the neighbouring junction points directly on the object on the basis of an electric plan and possible changes.

These data are entered into the computer program, and simultaneously the types of wires are defined by cross sections, insulation colours in compliance with standards, their functions, e.g. phase, earth duct, switch wire, and the like, and each corresponding fuse, junction units, e.g. connection boxes between the wires of each circuit and final consumer, e.g. lamp, wall socket, cooker and the like and its location, e.g. kitchen.

The computer program has an algorithm to define adequate bundles between the neighbouring junction points and foresees unambiguous labels for each wire separately and for bundles. It is typical that the labels of ends of neighbouring wires in the same junction points foreseen for a joint connection are such to be recognized by the fitter without any knowledge of electricity. Preferably, the labels of ends of a variety of wires intended for a joint junction are the same.

Furthermore the program selects an optimal terminal board with respect to the number of wires in a bundle, e.g. a type of a concealed tube, and labels it with an unambiguous label.

At the same time, the junction elements, e.g. connection boxes and other electric installation elements, e.g. wall sockets, switches, fuses and the like are gathered in groups, which are needed on individual locations, e.g. in the kitchen, and then packaged and labelled with an unambiguous label.

The fitter therefore has marked bundles of wires fixed in terminal boards and packages of other installation material, needed in each location, available for use in packagings.

Based on the actual conditions in the building, holes for connection boxes and grooves for terminal boards are first prepared and fixed in an optional known way, preferably by plaster. Then terminal boards with bundles of wires are installed into grooves from one junction point to another. Unambiguous labels on each element separately and simultaneously in the plan contribute to a simple installation without any previous knowledge of electricity. At the end, the ends of wires and electric elements are connected on the basis of labels on the ends of wires.

It is understandable that a man skilled in this field and on the basis of the invention can design another device of this type, e.g. an even more automated or robotized device, it is also possible without circumventing the essence of the invention, to amend the method of wiring installation with additional devices for positioning and temporary fixing of various wiring elements.

The invention claimed is:

1. A method of manufacturing bundles of wires, the method comprising:

(a) precisely measuring lengths between neighboring junction points directly on an object on the basis of an electric plan, (b) entering data from said measuring lengths into a computer, (c) defining wire types by one or more of wire cross-sections, insulation colors in compliance with one or more standards, and wire functions, (d) assigning each wire to one or more of a corresponding fuse, junction units, and a wire location, (e) arranging bundles of wires so as to be fixed in terminal boards and labeled with an unambiguous label and a respective electric installation elements, (f) fitting junction elements into prepared holes in a building and between the prepared holes into the terminal boards with bundles of wires, (g) connecting ends of wires in junction points on the basis of suitability of all unambiguous labels at the ends of wires and other elements without requiring any knowledge of an overall wiring diagram.

2. A method of manufacturing bundles of wires for installation in a building, the method comprising:

measuring lengths between neighboring junction points in the building on the basis of an electrical wiring plan;

defining each of a plurality of wire types by one or more of a cross-section, a standard insulation color, and a wiring function;

determining, for each of the plurality of wire types, a number of wires of each wire type;

assigning each of the wires to a corresponding type of connection box and a location in the building;

bundling selected ones of the wires into one or more bundles of wires;

labeling a plurality of the wires with associated unambiguous labels that separately identifies each of the plurality of wires;

arranging the one or more bundles of wires in a terminal board;

fitting connection boxes into holes in the building and, between selected connection boxes, installing the terminal board containing the one or more bundles of wires; and connecting ends of the wires at the selected connection boxes on the basis of suitability of the associated unambiguous labels without requiring any knowledge of the electrical wiring plan.

3. The method of claim 2, further comprising entering at least the measurement length data into a computer configured to define adequate bundles between neighboring junction points in the building.

4. A computer-implemented method for manufacturing pre-fabricated bundles of wires for installation in a building, the method comprising using a computer programmed to carry out the functions of:

receiving, as an input, measured lengths between neighboring junction points in the building on the basis of an electric plan;

defining various wire types by one or more of a cross-section, a standard insulation color, and a wiring function;

assigning each of a plurality of wires determined by the electric plan to a corresponding type of connection box and a location in the building; and determining unambiguous labels that identify each of the plurality of wires.

5. The method of claim 4, further comprising causing the determined unambiguous labels to be printed.

6. The method of claim 4, further comprising controlling the manufacturing of the pre-fabricated bundles of wires by receiving an electrical signal representing an actual length of wire being cut.

7. The method of claim 4, wherein said determining unambiguous labels comprises ensuring that labels for a joint connection are identical.

8. The method of claim 4, further comprising selecting an optimal terminal board with respect to a number of wires in a bundle.

9. The method of claim 4, further comprising listing one or more junction elements including wall sockets, switches, and fuses, and linking each of the one or more junction elements to an individual location in the building.

* * * * *